United States Patent
Yamada et al.

(10) Patent No.: US 10,282,892 B2
(45) Date of Patent: May 7, 2019

(54) IMAGE SPACE-BASED PARTICLE GENERATION MODELING

(71) Applicant: International Business Machines Corporation, Armonk, NY (US)

(72) Inventors: Yasunori Yamada, Kawaguchi (JP); Kun Zhao, Funabashi (JP)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/890,378

(22) Filed: Feb. 7, 2018

(65) Prior Publication Data

US 2019/0005707 A1 Jan. 3, 2019

Related U.S. Application Data

(63) Continuation of application No. 15/638,597, filed on Jun. 30, 2017.

(51) Int. Cl.
*G06T 15/08* (2011.01)
*G06T 11/00* (2006.01)

(52) U.S. Cl.
CPC ............ *G06T 15/08* (2013.01); *G06T 11/003* (2013.01)

(58) Field of Classification Search
None
See application file for complete search history.

(56) References Cited

U.S. PATENT DOCUMENTS 6,014,143 A * 1/2000 Naqvi .................. G06T 15/06
345/421
2016/0042552 A1 2/2016 McNabb

OTHER PUBLICATIONS

Drebin et al., "Volume Rendering", Computer Graphics, vol. 22, No. 4, Aug. 1988, pp. 65-74.
Koyamada et al., "A Particle Modeling for Rendering Irregular Volumes", Tenth International Conference on Computer Modeling and Simulation, © 2008 IEEE, pp. 372-377.
Sabella, Paolo, "A Rendering Algorithm for Visualizing 3D Scalar Field", Computer Graphics, vol. 22, No. 4, Aug. 1988, pp. 51-58.
Sakamoto et al., "Improvement of particle-based volume rendering for visualizing irregular volume data sets", Computers & Graphics, vol. 34, No. 1, © 2009 Elsevier Ltd, pp. 34-42.
Zhao et al., "Adaptive Fused Visualization for Large-scale Blood Flow Dataset with Particle-based Rendering", Journal of Visualization, vol. 18, No. 2, ISSN 1343-8875, 2015, Published by Springer, pp. 133-145.
Yamada et al., "Image Space-Based Particle Generation Modeling", U.S. Appl. No. 15/638,597, filed Jun. 30, 2017, 35 pages.
IBM Appendix P, list of patents and patent applications treated as related, filed herewith, 2 pages.
Garate, Matias, "Voxel datacubes for 3D visualization in Blender", arXiv:1611.0696v1 {astro-ph.IM] Nov. 21, 2016, 14 pages.

(Continued)

*Primary Examiner* — Ryan M Gray
(74) *Attorney, Agent, or Firm* — Stephanie L. Carusillo

(57) ABSTRACT

Volume rendering is performed by a method, comprising: obtaining an original volume data, transforming the original volume data based on a distance from a viewpoint to the original volume data, to generate transformed volume data, generating particles from the transformed volume data, and projecting the particles on an image plane to obtain a 2D image corresponding to the original volume data.

1 Claim, 7 Drawing Sheets

(56) References Cited

OTHER PUBLICATIONS

Zhao et al., "Fused Visualization for Large-scale Time-varying Volume Data with Adaptive Particle-based Rendering", Kyoto University, Japan, Kyoto University Research Information Repository, Citation Communications in Computer and Information Science (2014), 474: 228-242, 16 pages.

* cited by examiner

IMAGE SPACE-BASED PARTICLE GENERATION MODELING

BACKGROUND

The present invention relates generally to the field of volume rendering, and more particularly to image space-based particle generation modeling.

Volume rendering is a set of techniques used to visualize a two-dimensional (2D) projection of a three-dimensional (3D) data set. A variety of volume rendering techniques have been used for visualizing volume data. For example, ray casting and Particle-Based Volume Rendering (PBVR) techniques have been used for volume rendering.

SUMMARY

According to a first aspect of the present invention, provided is a method, including obtaining an original volume data, transforming the original volume data based on a distance from a viewpoint to the original volume data, to generate transformed volume data, dividing the transformed volume data into a plurality of voxels, generating particles from the transformed volume data, and projecting the particles on an image plane to obtain a 2D image corresponding to the original volume data, generating a plurality of the 2D images corresponding to the original volume data, and averaging the plurality of the 2D images to generate an ensemble 2D image.

The first aspect may also include an apparatus performing this method, and a computer program product storing instructions embodied on a computer-readable medium or programmable circuitry, for causing a processor or the programmable circuitry to perform the method. The summary clause does not necessarily describe all features of the embodiments of the present invention. Embodiments of the present invention may also include sub-combinations of the features described above.

DETAILED DESCRIPTION

Embodiments of the present invention recognize that current volume rendering techniques for visualizing volume data, such as ray casting and Particle-Based Volume Rendering (PBVR), require significant computational resources. Embodiments of the present invention provide techniques for accurate volume rendering while requiring fewer computational resources.

Hereinafter, example embodiments of the present invention will be described. The example embodiments shall not limit the invention according to the claims, and the combinations of the features described in the embodiments are not necessarily essential to the invention.

Figure 1:
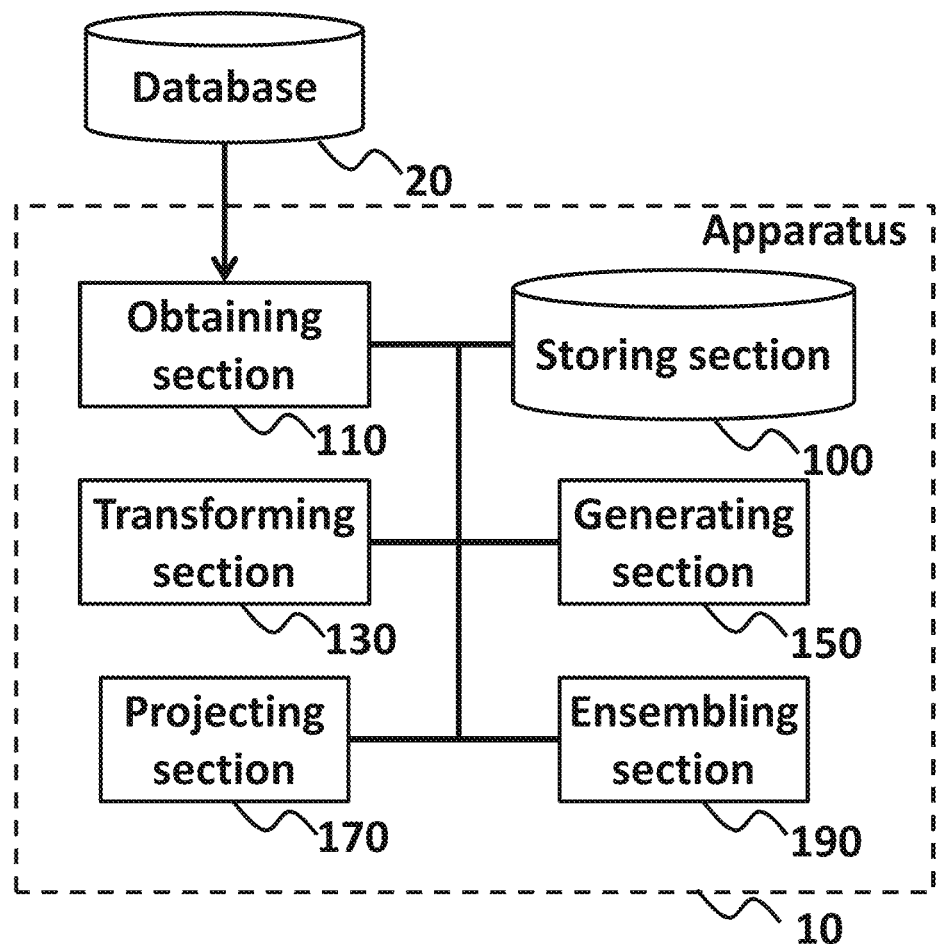
FIG. 1 shows an exemplary configuration of an apparatus 10, according to an embodiment of the present invention.

FIG. 1 shows an exemplary configuration of an apparatus 10, according to an embodiment of the present invention. The apparatus 10 may perform volume rendering of volume data. The apparatus 10 may include a processor and/or programmable circuitry.

The apparatus 10 may further include one or more computer readable mediums collectively including instructions. The instructions may be embodied on the computer readable medium and/or programmable circuitry. The instructions, when executed by the processor or the programmable circuitry, may cause the processor or the programmable circuitry to operate as a plurality of operating sections. Thereby, the apparatus 10 may be regarded as including a storing section 100, an obtaining section 110, a transforming section 130, a generating section 150, a projecting section 170, and an ensembling section 190.

The storing section 100 may store information used for the processing that the apparatus 10 performs. The storing section 100 may also store a variety of data/instructions used for operations of the apparatus 10. One or more other elements in the apparatus 10 (e.g., the obtaining section 110, the transforming section 130, the generating section 150, the projecting section 170, the ensembling section 190, etc.) may communicate data directly or via the storing section 100, as necessary. The storing section may be implemented by a volatile or non-volatile memory of the apparatus 10. In an embodiment, the storing section 100 stores original volume data, transformed volume data, and other data related thereto.

The obtaining section 110 may obtain an original volume data. The obtaining section 110 may obtain the original volume data from the storing section 100 or an external database, such as a database 20. In an embodiment, the original volume data includes a plurality of voxels, each of which may have information of opacity and/or color.

The transforming section 130 may transform the original volume data to generate transformed volume data. In an embodiment, the transforming section 130 performs the transformation based on a distance from a viewpoint to the original volume data. In an embodiment, the transforming section 130 generates the transformed volume data by transforming 3D position coordination of the original volume data. The transforming section 130 may further divide the transformed volume data into a plurality of voxels.

The generating section 150 may generate particles from the transformed volume data. In an embodiment, the particles correspond to micro opaque portions of the object(s) in the transformed volume data. In an embodiment, the generating section 150 stochastically generates the particles based on the transformed volume data.

The projecting section 170 may project the particles on an image plane. The projecting section 170 may generate a 2D image with the projected particles, and thereby obtain the 2D image corresponding to the original volume data. The projecting section 170 may obtain a plurality of the 2D images.

The ensembling section 190 may perform ensembling of the plurality of 2D images to generate an ensemble 2D image. The ensembling section 190 may output the ensemble 2D image as a result of the volume rendering.

Figure 2:
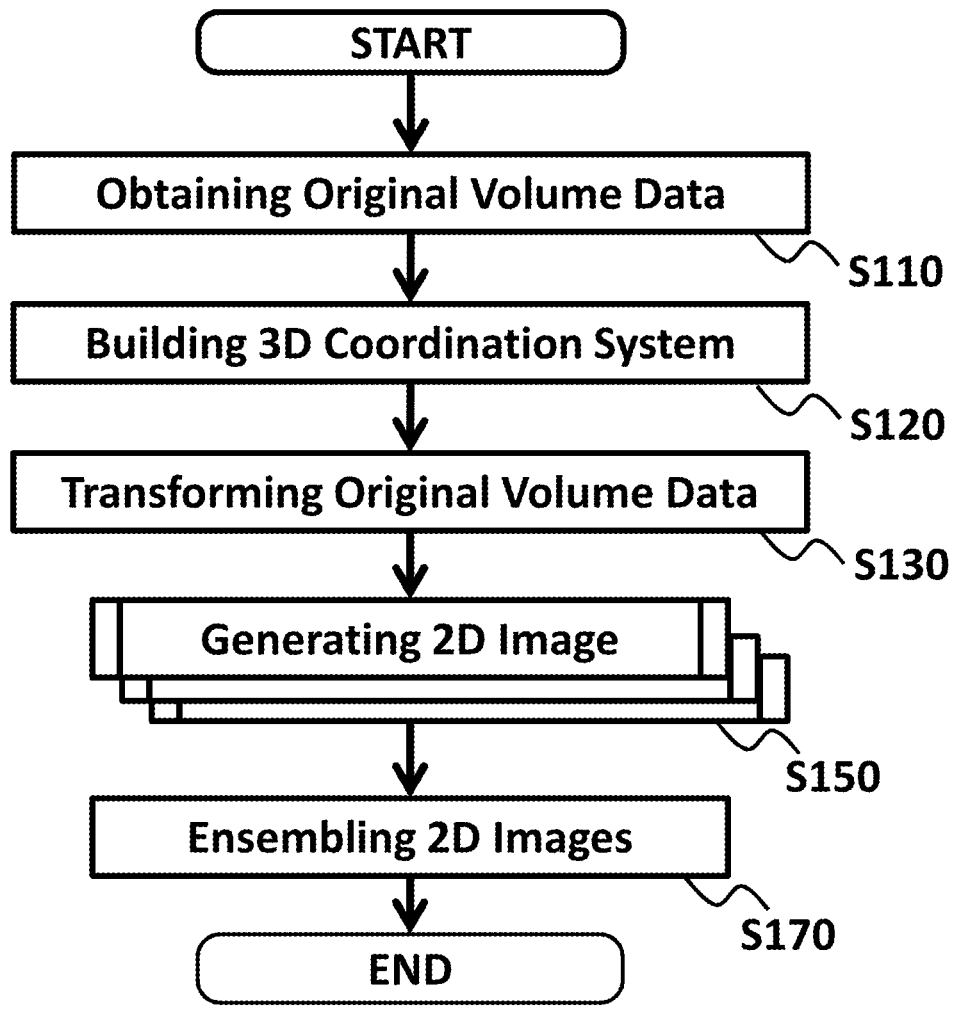
FIG. 2 shows an operational flow according to an embodiment of the present invention.

FIG. 2 shows an operational flow according to an embodiment of the present invention. The present embodiment describes an example in which an apparatus, such as the apparatus 10, performs the operations from S110 to S170, as shown in FIG. 2. The apparatus may perform volume rendering throughout S110-S170.

At S110, an obtaining section, such as the obtaining section 110, may obtain an original volume data from a database such as the database 20. In an embodiment, the original volume data is voxel data, which may represent one or more objects in 3D space.

The voxel data may include a plurality of voxels each having information of brightness, darkness, color, opacity, and/or other characteristics. In an embodiment, each voxel includes opacity information, which represents a degree to which each voxel is opaque (or transparent). In an embodiment, each voxel further includes information of color (e.g., brightness values in RGB format).

In an embodiment, the obtaining section further obtains parameters relating to 3D rendering. For example, the obtaining section may receive a gaze direction, and/or, a distance between the viewpoint and a center of a 3D space of the original volume data, from a user of the apparatus 10. The obtaining section may further receive a location of a viewpoint and/or a direction of the 3D space of the original volume data.

In an embodiment, some or all of these parameters are preset. For example, the distance between the viewpoint and the center of the 3D space of the original volume data may be initialized with a value suitable for proper volume rendering.

At S120, a transforming section, such as the transforming section 130, may build a 3D coordination system for the original volume data. In an embodiment, the transforming section performs coordinate conversion of the original volume data by rotating the original volume data based on the gaze direction and/or the direction of the 3D space of the original volume data, to obtain a rotated original volume data.

A 3D space of the original volume data may have a cubic shape including sides oblique to an image plane, which is normal to the gaze direction. The transforming section may rotate the original volume data such that the 3D space of the rotated original volume data may have a cubic shape including sides parallel to the image plane. An angle of the rotation may correspond to angle between the sides of the 3D space of the original volume data and the image plane.

In an embodiment, the transforming section calculates position coordinates of voxels of the original volume data after a rotation. The transforming section may then determine values of voxels in a 3D space based on the values of the voxels of the original volume data and the calculated position coordinates. The transforming section may obtain the determined values of the voxels of the 3D space as the rotated original volume data. The transforming section may perform the building of the 3D coordination system by other known algorithms.

In an embodiment, if the gaze direction is determined to match with the 3D space of the original volume data, then the transforming section does not perform the operation of S120. Hereinafter, the original volume data with or without the rotation may be collectively referred to as the original volume data.

At S130, the transforming section may transform the original volume data based on a distance from a viewpoint to the original volume data, to generate transformed volume data.

Figure 3:
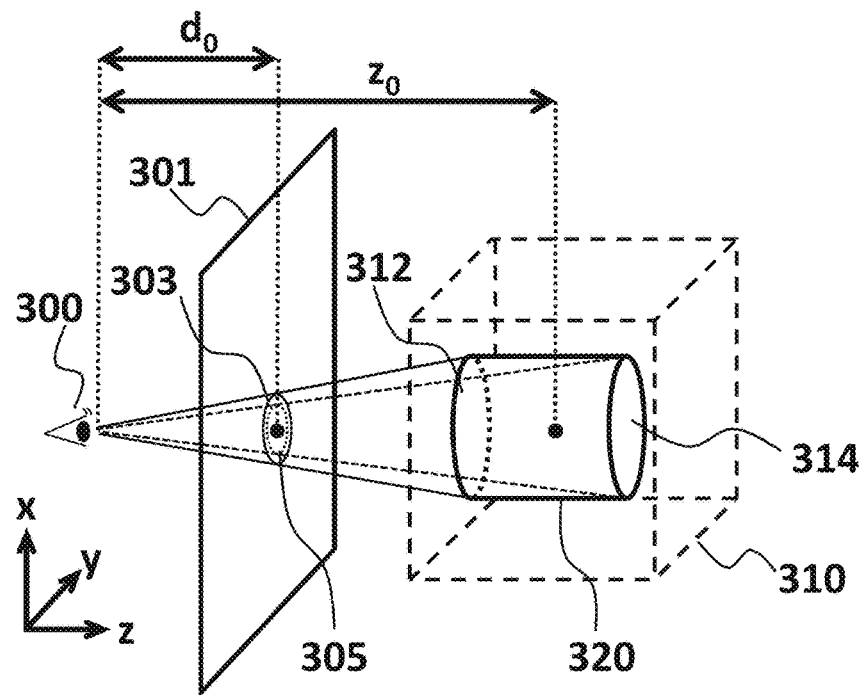
FIG. 3 shows a relationship between an image plane and an original volume data according to an embodiment of the present invention.

FIG. 3 shows a relationship between an image plane and an original volume data according to an embodiment of the present invention. According to FIG. 3, the original volume data 310 includes a cylindrical object 320, which are represented by voxels of the original volume data 310. As shown in FIG. 3, the original volume data 310 may correspond to a cubic space or a rectangular parallelepiped space.

The cylindrical object 320 includes a first circular side 312, and a second circular side 314, which is more distant to an image plane 301 (which is parallel to an x-y plane). When projecting the cylindrical object 320 on the image plane 301 toward a viewpoint 300, a first projection 303 of the first side 312 and a second projection 305 of the second side 314 are formed on the image plane 301.

In an embodiment, a distance between the viewpoint 300 and the image plane 301 is defined as $d_0$. A distance between the viewpoint 300 and a center of 3D space of the original volume data 310 is defined as $z_0$. A gaze direction is parallel to a z-axis.

Figure 4:
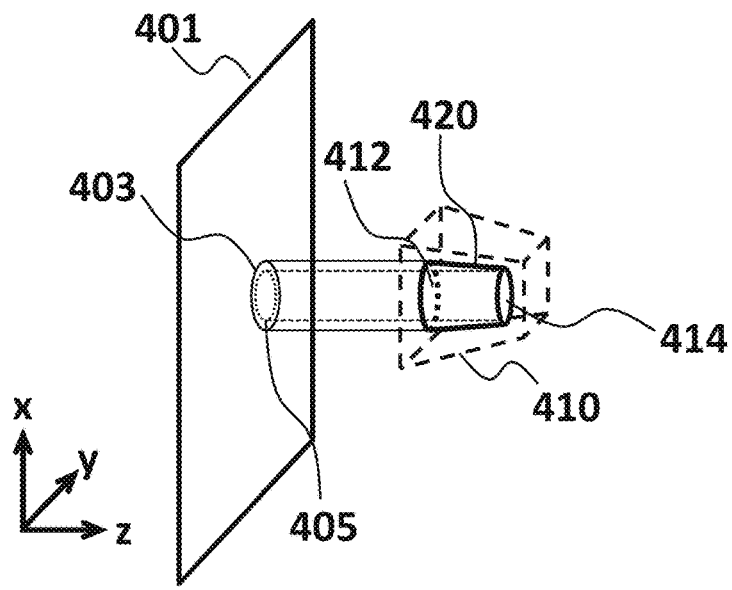
FIG. 4 shows a relationship between an image plane and a transformed volume data according to an embodiment of the present invention.

FIG. 4 shows a relationship between an image plane and a transformed volume data according to an embodiment of the present invention. According to FIG. 4, a transformed volume data 410 may represent a transformed cylindrical object 420. In an embodiment, the transformed volume data 410 includes position coordinates of voxels and values of the voxels.

As shown in FIG. 4, the position coordinates of voxels of the transformed volume data 410 may be located within a truncated pyramid shape. The transformed volume data 410 may include the transformed object 420, which may have a truncated cone shape. A size of the image plane 301 may be the same as the image plane 401.

The transformed object 420 includes a first circular side 412, corresponding to the first side 312, and a second circular side 414, corresponding to the second side 314. When projecting the transformed object 420 on the image plane 301 in a direction of a normal vector of the image plane 401 (e.g., a direction of z-axis), a first projection 403 of the first side 412 and a second projection 405 of the second side 414 are formed on the image plane 401 (which is parallel to a x-y plane).

In an embodiment, the transforming section transforms the original volume data 310 as shown in FIG. 3 to the transformed volume data 410 as shown in FIG. 4. In the embodiment, the transforming section transforms the original volume data 310 based on the distance from the viewpoint 300 to a cross-sectional plane (which is parallel to the image plane 301) of the original volume data 310.

In the embodiment, the transforming section transforms the original volume data 310 such that a cross-sectional plane parallel to a x-y plane in the original volume data 310 is diminished or enlarged by a factor proportional to a distance from the viewpoint 300 to the cross-sectional plane.

In the embodiment, the transforming section transforms the original volume data 310 such that a length of the transformed volume data 410 intersecting the cross-sectional plane is equal to a length of the original volume data 310 projected on the image plane 301 toward the viewpoint 300. For example, a size of the first projection 303 may be equal to a size of the first projection 403, and a size of the second projection 305 may be equal to a size of the second projection 405.

In an embodiment, the transforming section calculates (x', y', z') according to the following formula (1):

$$\begin{pmatrix} x' \\ y' \\ z' \end{pmatrix} = \begin{pmatrix} \frac{d_0}{z} & 0 & 0 \\ 0 & \frac{d_0}{z} & 0 \\ 0 & 0 & \frac{d_0}{z_0} \end{pmatrix} \begin{pmatrix} x \\ y \\ z \end{pmatrix}, \quad (1)$$

where (x, y, z) represents coordinates of the voxels of the original volume data 310, and (x', y', z') represents the coordinates of the transformed volume data 410.

The values (e.g., opacity and color) of a voxel at (x, y, z) of the original volume data may be represented as f(x, y, z). For example, a voxel located at the x-th position on the x-axis, the y-th position on the y-axis, and the z-th position on the z-axis may have values f(x, y, z).

The values at (x, y, z) in the transformed volume data is shown as f'(x, y, z). Assuming that coordinates of the original volume data (1, 1, 1) ... (N, N, N) are transformed as $(X_1, Y_1, Z_1)$ ... $(X_N, Y_N, Z_N)$, then f(a, b, c) is equal to f'($X_a$, $Y_b$, $Z_c$).

In an embodiment, the transforming section generates a set of $(X_1, Y_1, Z_1)$ and f'($X_1, Y_1, Z_1$), a set of $(X_2, Y_2, Z_2)$ and f'($X_2, Y_2, Z_2$), ..., and a set of $(X_N, Y_N, Z_N)$ and f'($X_N$, $Y_N$, $Z_N$) as the transformed volume data, from N×N×N voxels of the original volume data. For example, the transforming section may apply (1, 1, 1) ... (N, N, N) to the above formula (1) as (x, y, z) to obtain $(X_1, Y_1, Z_1)$ ... $(X_N, Y_N, Z_N)$ as (x', y', z'), and obtain values of f(1, 1, 1) ... f(N, N, N) as f'($X_1, Y_1, Z_1$) ... f'($X_N, Y_N, Z_N$).

After generating the transformed volume data, the transforming section may generate transformed voxel data based on the transformed volume data. The transformed voxel data may include a plurality of voxels that cover the space of the transformed volume data. Position coordinates of the plurality of voxels of the transformed voxel data may be represented as (1, 1, 1), ... (P, P, Q).

Figure 5:
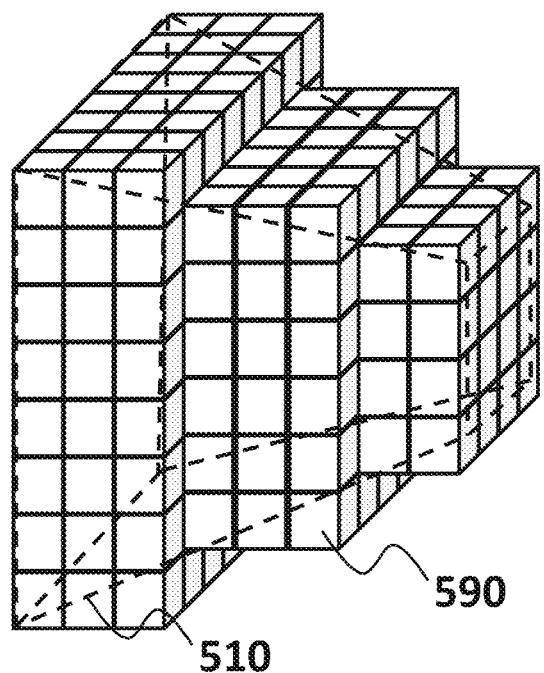
FIG. 5 shows a relationship between the transformed volume data and transformed voxel data.

FIG. 5 shows a relationship between the transformed volume data 510 and transformed voxel data 590. In an embodiment, a space of the transformed voxel data 590 encompasses a space of the transformed volume data 510 (indicated by dashed lines).

In the embodiment of FIG. 5, Q is 8, P is 6, and position coordinates of voxels of the transformed voxel data are (1, 1, 1) ... (8, 8, 1), (1, 1, 2) ... (8, 8, 2), (1, 1, 3) ... (8, 8, 3), (2, 2, 4) ... (7, 7, 4), (2, 2, 5) ... (7, 7, 5), (2, 2, 6) ... (7, 7, 6), (3, 3, 7) ... (6, 6, 8), (3, 3, 7) ... (6, 6, 8).

The transforming section may calculate values of voxels of the transformed voxel data 590. The transforming section may perform interpolation for the transformed volume data 410 to obtain the transformed voxel data 590. In an embodiment, the transforming section calculates values of voxels in the transformed voxel data f'(1, 1, 1) ... f'(N-M, N-M, N) based on the transformed volume data 410. In an embodiment, the transforming section performs the interpolation by known algorithms.

At S150, the apparatus may generate a 2D image of the transformed volume data. In an embodiment, the apparatus performs a plurality of operations of S150 to generate a plurality (e.g., tens or hundreds) of 2D images of the transformed volume data. In the embodiment, the apparatus performs the operations of S150 in parallel.

Figure 6:
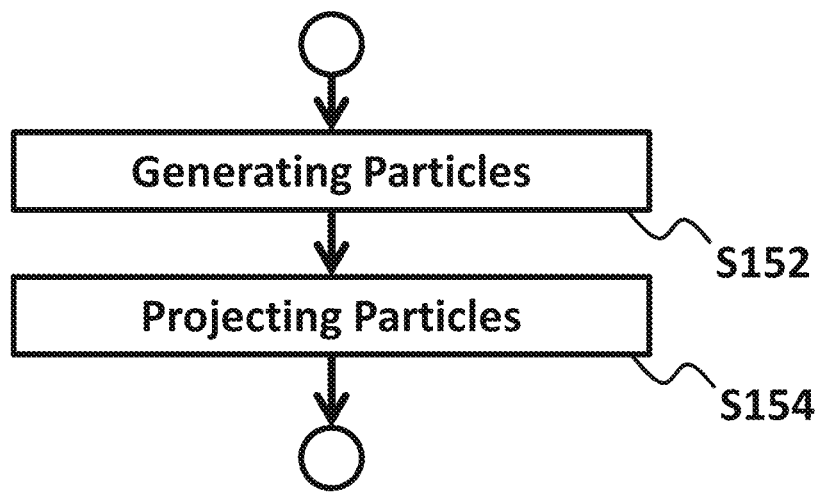
FIG. 6 shows a sub-flow of S150 according to an embodiment of the present invention.

FIG. 6 shows a sub-flow of S150 according to an embodiment of the present invention. In an embodiment, a generating section such as the generating section 150 and a projecting section such as the projecting section 170 performs operations of S152-S154 to perform the operation of S150 of FIG. 2.

At S152, the generating section may generate particles from the transformed volume data. In an embodiment, the generating section determines whether to generate a particle for each voxel of the plurality of voxels of the transformed voxel data.

In an embodiment, the generating section generates a particle for each voxel with a probability corresponding to the opacity of each voxel of the transformed voxel data. For example, the generating section may be more likely to generate particles for a voxel when opacity of the voxel is higher.

Figure 7:
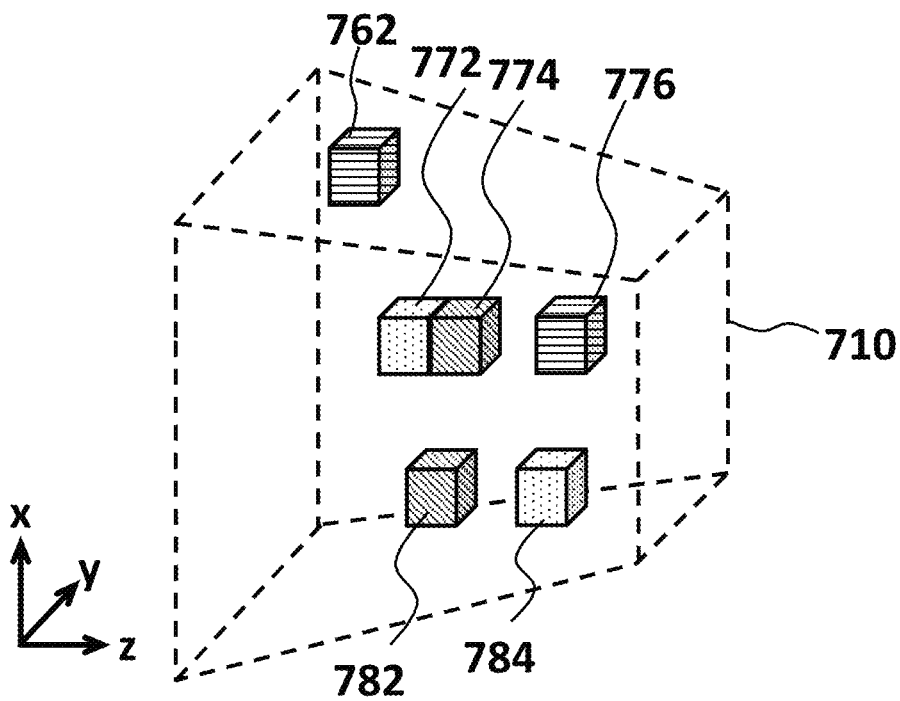
FIG. 7 shows particles according to an embodiment of the present invention.

FIG. 7 shows particles according to an embodiment of the present invention. The transformed volume data 710 may correspond to the transformed volume data 410 in FIG. 4. In the embodiment of FIG. 7, the generating section generates a particle 762, a particle 772, a particle 774, a particle 776, a particle 782, and a particle 784 in a space of the transformed volume data 710.

The particle 762, the particle 772, the particle 774, the particle 776, the particle 782, and the particle 784 may be generated based on their corresponding voxels in the transformed voxel data, such as the transformed voxel data 590.

Figure 8:
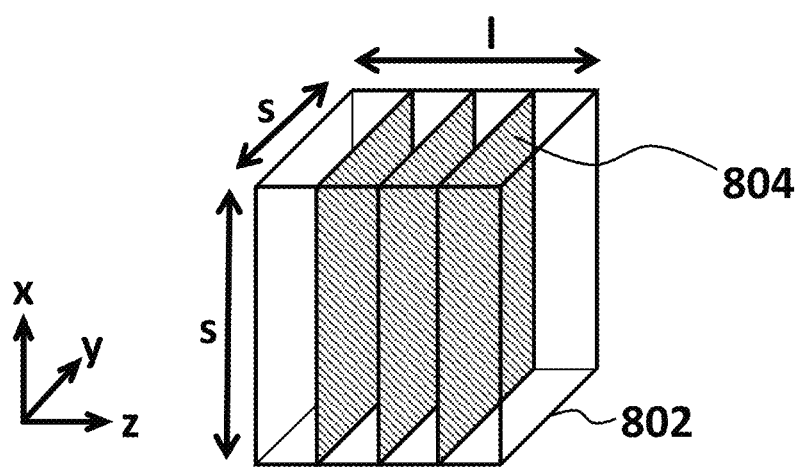
FIG. 8 shows a particle and sub-particles in the particle according to an embodiment of the present invention.

FIG. 8 shows a particle and sub-particles within the particle according to an embodiment of the present invention. In the embodiment of FIG. 8, a particle 802 includes three sub-particles 804. The particle 802 may represent one particle, such as the particle 762, the particle 772, the particle 774, the particle 776, the particle 782, and the particle 784 in FIG. 7.

As shown in FIG. 8, a size of the particle 802 may be represented as s×s×l, where s may be a length in horizontal direction (e.g., y-axis) and a length in vertical direction (e.g., x-axis) of the particle 802, and l may be a length along with gaze direction (e.g., z-axis). In an embodiment, the lengths s and l are equal to a length of 1 pixel of a 2D image.

The generation of a particle by the generating section may be explained with the generation of sub-particles 804 in accordance with a Poisson distribution $$p(k) = \frac{\exp(-n)n^k}{k!}$$

along z-axis, where p(k) is a probability that k sub-particles are generated, and n is an expectation of a number of sub-particles generated. The generating section may generate a particle for each voxel when one or more sub-particles are to be generated in each voxel. The generating section may not generate a particle for each voxel when no sub-particles are to be generated in each voxel.

The sub-particles and the particles may be considered to be opaque. As such, when no sub-particles exist in a voxel, the voxel is totally transparent. The possibility of no sub-particles (i.e., the possibility of transparency) may be calculated as p(0)=exp(−n) according to the above Poisson distribution p(k).

Opacity α of a voxel may relate to the number of sub-particles n generated in the voxel. In an embodiment, the opacity α is represented as: $\alpha = 1 - \exp(-n) = 1 - \exp(-\rho s^2 l)$, where ρ is a density function. The density function ρ can be represented as $$\rho = \frac{-\log(1-\alpha)}{s^2 l},$$

and when s and l are equal to 1 pixel, ρ is calculated as $-\log(1-\alpha)$.

In an embodiment, the generating section generates one particle for each voxel with a probability corresponding to $-\log(1-\alpha)$ (i.e., ρ), where α is an opacity of each voxel. In the embodiment, the generating section generates one particle in each voxel if ρ, as calculated from opacity α of each voxel, is equal to or larger than a predetermined value (e.g., 1), and generate one particle with a probability of ρ if ρ is smaller than the predetermined value.

In an alternative embodiment, the generating section generates one particle with a probability corresponding to $1-\exp(-\rho)$. In an alternative embodiment, the generating section generates one particle with a probability corresponding to the opacity α.

Each particle may include color information. In an embodiment, each particle has a color of a voxel corresponding to each particle. In the embodiment of FIG. 7, when a voxel corresponding to the particle 762 in the transformed voxel data is green, then the particle 762 has color information of green.

Figure 9:
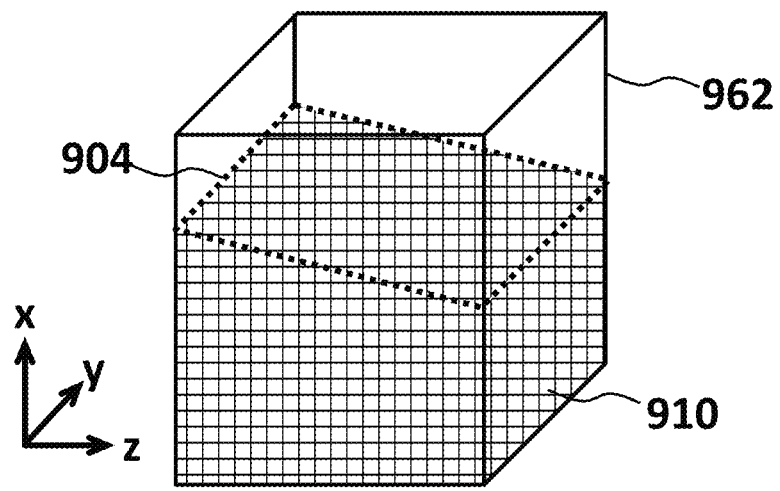
FIG. 9 shows a particle including boundary surface of the transformed volume data according to an embodiment of the present invention.

FIG. 9 shows a particle including boundary surface of the transformed volume data according to an embodiment of the present invention. In an embodiment, such as when the transformed volume data (e.g., transformed volume data 510 in FIG. 5) has a truncated pyramid shape, some voxels in the transformed voxel data (e.g., transformed voxel data 590 in FIG. 5) include portions of a boundary surface of the truncated pyramid shape. For example, a voxel 962 may correspond to a voxel generating the particle 762 in FIG. 7, and include the partial boundary surface 904, which is a portion of the truncated pyramid shape. Thereby, the particle 962 may include a partial truncated pyramid shape 910.

In an embodiment, the generating section performs generation of the particles for all voxels including the partial truncated pyramid shape 910. In an embodiment, the generating section performs generation of the particles for voxel(s) of which partial truncated pyramid shape is larger than a threshold (e.g., a half of volume of a voxel).

In an embodiment, the generating section performs generation of the particles for all voxels, including the boundary surface, by multiplying a proportion of a volume of the partial truncated pyramid shape by a volume of each voxel by the density function ρ of each voxel.

At S154, a projecting section, such as the projecting section 170, may project the particles generated at S152 on an image plane. The particles projected on the image plane may give a 2D image.

Figure 10:
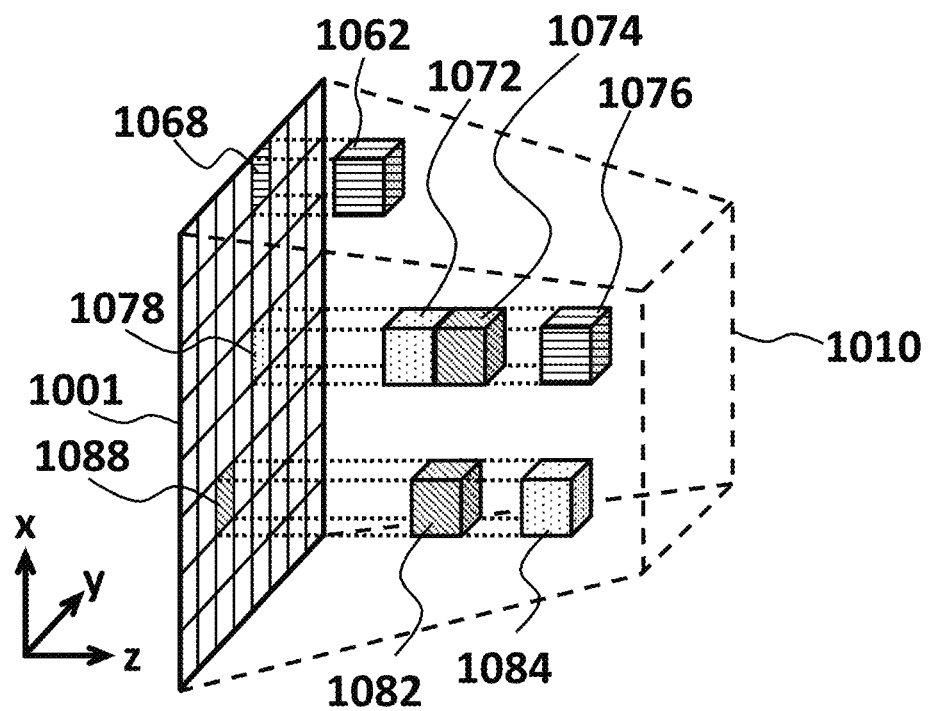
FIG. 10 shows a 2D image and the particles according to an embodiment of the present invention.

FIG. 10 shows a 2D image and the particles according to an embodiment of the present invention. Transformed volume data 1010 in FIG. 10 may correspond to the transformed volume data 710 in FIG. 7. A particle 1062, a particle 1072, a particle 1074, a particle 1076, a particle 1082, and a particle 1084 in FIG. 10 may correspond to the particle 762, the particle 772, the particle 774, the particle 776, the particle 782, and the particle 784 in FIG. 7.

In an embodiment, the projecting section projects only particle(s) that are nearest the image plane among particles along a gaze direction (e.g., z-axis). In the embodiment of FIG. 10, the projecting section projects the particle 1062, projects the particle 1072 among the particles 1072-1076, and projects the particle 1082 between the particle 1082 and the particle 1084. The particles behind the nearest particles (e.g., the particles 1074, 1076, and 1084) may not be projected and thus may not be reflected in the 2D image.

The projecting section may project the particles in a direction parallel to a normal vector of the image plane. In an embodiment, the projecting section projects the particles 1062, 1072, and 1082 in a direction of z-axis.

An image plane 1001 may correspond to the image plane 401 in FIG. 4. The 2D image may be generated by the projection of the particles on the image plane 1001. In an embodiment, the 2D image includes a plurality of pixels (e.g., 8×8 pixels in the embodiment of FIG. 10), and each of the particles is projected on a pixel. For example, in FIG. 10, the particle 1062 is projected on a pixel 1068, the particle 1072 is projected on a pixel 1078, and the particle 1082 is projected on a pixel 1088.

A shape and/or size of each particle projected on the image plane may be identical to a shape and/or size of each pixel in the 2D image. In the embodiment of FIG. 10, the shape and size of the particles 1062, 1072, 1074, 1076, 1082, and 1084 projected on the image plane 1001 are the same as the shape and size of each pixel of the 2D image on the image plane 901.

At a single operation of S154, the projecting section may obtain a single 2D image including the pixels, on which the particles are projected. Since the generating section may stochastically generate particles at S152, the projecting section may obtain different 2D images from the same transformed volume data at a plurality of operations of S154 in the plurality of operations of S150.

At S170, an ensembling section, such as the ensembling section 190, may ensemble the plurality of 2D images to generate an ensembled image as a result of volume rendering.

In an embodiment, the ensembling section obtains the plurality of the 2D images corresponding to the original volume data from the projecting section. The ensembling section may then average the plurality of the 2D images to obtain an image. The ensembling section may perform the ensembling by known algorithms.

As explained in relation to the above embodiments, the apparatus may first transform the original volume data so as to reflect the perspective view from the viewpoint, and thereby the projecting section may project the particle in a direction normal to the image plane.

According to ray casting and PBVR, many computational resources may be needed for accurate volume rendering, or tuning of hyper parameters (such as cell size) may be required. Meanwhile according the embodiments, the apparatus may perform accurate volume rendering using less computational resources without such tuning of the hyper parameters.

Figure 11:
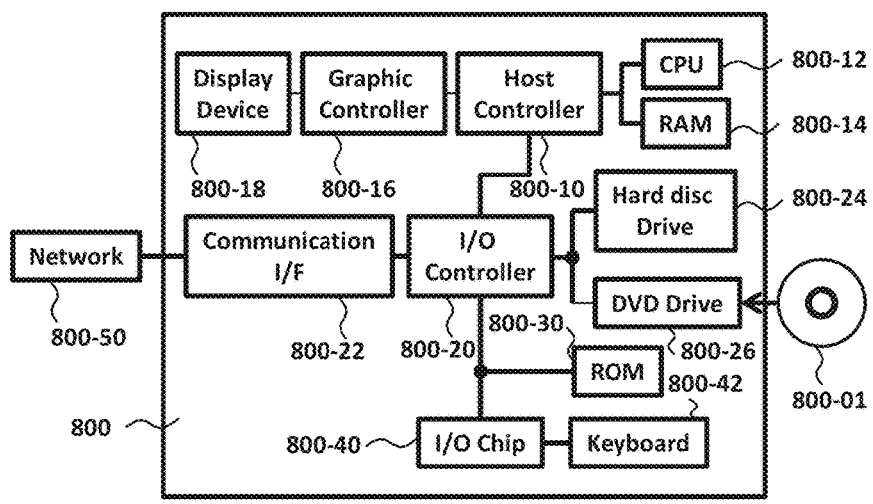
FIG. 11 shows an exemplary hardware configuration of a computer that functions as a system, according to an embodiment of the present invention.

FIG. 11 shows an exemplary hardware configuration of a computer configured for image space-based particle generation modeling, according to an embodiment of the present invention. A program that is installed in the computer 800 can cause the computer 800 to function as or perform operations associated with apparatuses of the embodiments of the present invention or one or more sections (including modules, components, elements, etc.) thereof, and/or cause the computer 800 to perform processes of the embodiments of the present invention or steps thereof. Such a program may be executed by the CPU 800-12 to cause the computer 800 to perform certain operations associated with some or all of the blocks of flowcharts and block diagrams described herein.

The computer 800 according to the present embodiment includes a CPU 800-12, a RAM 800-14, a graphics controller 800-16, and a display device 800-18, which are mutually connected by a host controller 800-10. The computer 800 also includes input/output units such as a communication interface 800-22, a hard disk drive 800-24, a DVD-ROM drive 800-26 and an IC card drive, which are connected to the host controller 800-10 via an input/output controller 800-20. The computer also includes legacy input/output units such as a ROM 800-30 and a keyboard 800-42, which are connected to the input/output controller 800-20 through an input/output chip 800-40.

The CPU 800-12 operates according to programs stored in the ROM 800-30 and the RAM 800-14, thereby controlling each unit. The graphics controller 800-16 obtains image data generated by the CPU 800-12 on a frame buffer or the like provided in the RAM 800-14 or in itself, and causes the image data to be displayed on the display device 800-18.

The communication interface 800-22 communicates with other electronic devices via a network 800-50. The hard disk drive 800-24 stores programs and data used by the CPU 800-12 within the computer 800. The DVD-ROM drive 800-26 reads the programs or the data from the DVD-ROM 800-01, and provides the hard disk drive 800-24 with the programs or the data via the RAM 800-14. The IC card drive reads programs and data from an IC card, and/or writes programs and data into the IC card.

The ROM 800-30 stores therein a boot program or the like executed by the computer 800 at the time of activation, and/or a program depending on the hardware of the computer 800. The input/output chip 800-40 may also connect various input/output units via a parallel port, a serial port, a keyboard port, a mouse port, and the like to the input/output controller 800-20.

A program is provided by computer readable media such as the DVD-ROM 800-01 or the IC card. The program is read from the computer readable media, installed into the hard disk drive 800-24, RAM 800-14, or ROM 800-30, which are also examples of computer readable media, and executed by the CPU 800-12. The information processing described in these programs is read into the computer 800, resulting in cooperation between a program and the above-mentioned various types of hardware resources. An apparatus or method may be constituted by realizing the operation or processing of information in accordance with the usage of the computer 800.

For example, when communication is performed between the computer 800 and an external device, the CPU 800-12 may execute a communication program loaded onto the RAM 800-14 to instruct communication processing to the communication interface 800-22, based on the processing described in the communication program. The communication interface 800-22, under control of the CPU 800-12, reads transmission data stored on a transmission buffering region provided in a recording medium such as the RAM 800-14, the hard disk drive 800-24, the DVD-ROM 800-01, or the IC card, and transmits the read transmission data to network 800-50 or writes reception data received from network 800-50 to a reception buffering region or the like provided on the recording medium.

In addition, the CPU 800-12 may cause all or a necessary portion of a file or a database to be read into the RAM 800-14, the file or the database having been stored in an external recording medium such as the hard disk drive 800-24, the DVD-ROM drive 800-26 (DVD-ROM 800-01), the IC card, etc., and perform various types of processing on the data on the RAM 800-14. The CPU 800-12 may then write back the processed data to the external recording medium.

Various types of information, such as various types of programs, data, tables, and databases, may be stored in the recording medium to undergo information processing. The CPU 800-12 may perform various types of processing on the data read from the RAM 800-14, which includes various types of operations, processing of information, condition judging, conditional branch, unconditional branch, search/replace of information, etc., as described throughout this disclosure and designated by an instruction sequence of programs, and writes the result back to the RAM 800-14.

In addition, the CPU 800-12 may search for information in a file, a database, etc., in the recording medium. For example, when a plurality of entries, each having an attribute value of a first attribute is associated with an attribute value of a second attribute, are stored in the recording medium, the CPU 800-12 may search for an entry matching the condition whose attribute value of the first attribute is designated, from among the plurality of entries, and reads the attribute value of the second attribute stored in the entry, thereby obtaining the attribute value of the second attribute associated with the first attribute satisfying the predetermined condition.

The above-explained program or software modules may be stored in the computer readable media on or near the computer 800. In addition, a recording medium such as a hard disk or a RAM provided in a server system connected to a dedicated communication network or the Internet can be used as the computer readable media, thereby providing the program to the computer 800 via the network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to individualize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above, the embodiments of the present invention enable proper volume rendering with less computational resources, by transforming the original volume data and generating particles from the transformed volume data.

What is claimed is:

1. A method comprising: obtaining original volume data, wherein the original volume data comprises a plurality of voxels;
transforming each voxel of the plurality of voxels of the original volume data, based on a distance from a viewpoint to a cross-sectional plane of the original volume data and a second distance from an image plane to the center of the original volume data, to generate a transformed volume data, wherein the cross-sectional plane is parallel to the image plane, wherein the distance between the surface face of the original volume data furthest from the viewer and the surface face of the original volume data closest to the viewer when the original volume data is projected on to the image plane is equal to the length of the transformed volume data along a gaze direction of the viewer;

for each voxel of the plurality of voxels, generating a particle from the transformed volume data with a probability corresponding to: −log(1−an opacity of each voxel), wherein the original volume data includes the opacity for each voxel;

projecting the particles on an image plane to generate a 2D image corresponding to the original volume data, wherein:

a normal vector of the image plane is parallel to a direction of the projecting the particles, the 2D image includes a plurality of pixels, and wherein a size and shape of each pixel of the 2D image is identical to a size and shape of each particle projected on the image plane;

generating a plurality of the 2D images corresponding to the original volume data; and averaging the plurality of the 2D images to generate an ensemble 2D image.

* * * * *